United States Patent [19]

Brueggestrath

[11] Patent Number: 5,357,997
[45] Date of Patent: Oct. 25, 1994

[54] VALVE WITH SEGMENTED RETAINER RING

[75] Inventor: Bernd Brueggestrath, Bochum, Fed. Rep. of Germany

[73] Assignee: Adams GmbH & Co. Armaturen KG, Herne, Fed. Rep. of Germany

[21] Appl. No.: 118,061

[22] Filed: Sep. 7, 1993

[51] Int. Cl.[5] .............................................. F16K 1/228
[52] U.S. Cl. ........................................ 137/15; 251/307
[58] Field of Search .................. 137/15; 251/298, 306, 251/307

[56] References Cited

U.S. PATENT DOCUMENTS

| | | | |
|---|---|---|---|
| 3,144,040 | 8/1964 | White | 251/307 X |
| 3,393,697 | 7/1968 | Fawkes | 251/307 X |
| 3,726,504 | 4/1973 | Kormos et al. | 251/306 |
| 3,814,380 | 6/1974 | Kormos et al. | 251/307 |
| 4,220,314 | 9/1980 | Lynch | 251/307 |
| 4,244,387 | 1/1981 | Snape | 251/306 X |
| 4,281,818 | 8/1981 | Cunningham et al. | 251/307 |
| 4,398,696 | 8/1983 | Szilagyi et al. | 251/307 |

*Primary Examiner*—John Rivell
*Attorney, Agent, or Firm*—Townsend and Townsend Khourie and Crew

[57] ABSTRACT

A disc valve with a disc that is pivotable between open and closed positions has a metallic seal ring placed against an axially-oriented face formed by the housing and located at the ends of an enlarged conduit portion between the face and one of the ends of the housing. A three-part retainer ring which includes a main body located opposite the seal ring and a flange which extends radially outward from the main body and snugly fits into a groove in the housing is defined by at least three retainer ring segments. At least one of the retainer ring segments includes parallel ends which are opposite correspondingly parallel ends formed by the adjoining retainer ring segments so that this one segment can be radially moved past the other segments. Each segment includes one or more threaded bolts to generate an axially acting pressure against the seal ring, securely install the seal ring and bias it into sealing engagement with the housing face to prevent leakage therebetween when the disc is closed and one of its sides is subjected to fluid pressure. The axially acting pressure generated by the threaded bolts is transmitted from the main body of each retainer ring segment via the associated flange to the housing. Axially oriented locking pins prevent unintentional relative radial movements between the retainer ring segments.

29 Claims, 2 Drawing Sheets

VALVE WITH SEGMENTED RETAINER RING

BACKGROUND OF THE INVENTION

The present invention relates to the installation of seal rings in valve housings and in particular to the installation of seal rings in the housing of disc valves.

Expired U.S. Pat. No. 3,442,488 discloses a disc valve in which a disc is pivotable between an open position, in which the disc is substantially parallel to an axis through the housing, and a closed position in which the disc is generally transverse to the housing. The pivot axis of the disc is offset with respect to the main axis through the housing. The seal ring is installed on the disc and seals against the housing.

The commonly owned U.S. Pat. No. 4,281,817 discloses a similar valve in which the seal ring is in the housing and includes a radially inwardly projecting sealing surface which engages and cooperates with a peripheral seating surface of the disc to form a fluid-tight seal when the disc is in its closed position. In such valves provisions must be made for appropriately installing the seal ring in the housing. Typically, this involves the formation of an annular, enlarged diameter recess in a portion of the flow passage through the housing extending from an end thereof to an axially oriented face. The seal ring is placed against the face so that its sealing surface faces radially inward and a retainer ring, also disposed in the enlarged diameter conduit portion, is secured to the housing with threaded bolts which extend into the housing radially outward of the seal ring. The bolts pressure the retainer ring against the seal ring and the latter against the axially oriented face to securely install the seal ring in the housing and bias it into intimate contact with the axially oriented face to establish a seal between them. Thus, when the disc is closed and fluid pressure is applied to one side, fluid does not leak past the housing face-seal ring interface.

Seal ring installations as described in the preceding paragraph work well so long as the seal ring is constructed of a compressible material such as elastomers, for under relatively low pressure, low heat and/or with noncorrosive fluids or asbestos for installations subjected to higher temperatures and/or many types of corrosive fluids where conventional elastomers are not usable. Because of health hazards, however, the use of asbestos-based materials is no longer acceptable. In its stead it is now typically specified to employ metallic seal rings capable of withstanding the encountered temperatures, resisting corrosion by the fluid flowing through the valve and capable of establishing a seal with the closure member of the valve, e.g. the disc.

Although metallic seal rings are entirely satisfactory, from an operational point of the valve, it is much more difficult to prevent leakage past the interface between the valve housing and the seal ring as compared to seal rings constructed of relatively compressible materials. Metal seal ring installations require a significantly larger force with which the seal ring must be pressed against the cooperating, axially oriented face of the housing, and a relatively larger contact area between the two as compared to seal rings made of compressible materials such as asbestos, for example.

According to the prior art this force is generated by providing a retainer ring of the appropriate size so that it is strong enough to transmit the sealing pressure to the seal ring. Threaded bolts secure the retainer ring to the housing and generate the needed pressure. It is necessary that these bolts be placed radially outward of the outermost diameter of the seal ring. Since metal seal rings require a greater contact area with the opposing housing face to establish a seal and to prevent damage to the seal ring during operation, the bolts must be moved even further radially outward than was necessary for asbestos seal rings, for example. The extent to which the bolts can be moved radially outward, however, is limited by the standardized flanges at each end of the housing for connecting the valve with the pipeline in which it is installed. Moreover, the needed threaded holes in the housing have a tendency to weaken it which, for high pressure installations, might be unacceptable or outright dangerous.

There is, therefore, a present need for a metal seal ring installation for valve housings which are capable of generating the required, relatively large axial forces to engage the seal ring and seal it with respect to the housing so that leakage cannot occur when the disc is closed, while limiting the radial extent of the installation so as to not interfere with the connection of the valve to the pipeline and/or unacceptably weaken the housing.

SUMMARY OF THE INVENTION

The present invention provides such a seal ring installation by eliminating retainer rings which are bolted to the housing. In its stead, the seal ring is forced into sealing contact with the housing by providing a retainer ring having threaded bolts or the like which apply the needed sealing pressure against the seal ring. The retainer ring has a main body, which is generally axially aligned with the seal ring and carries the bolts, and a radially outwardly protruding flange which snugly fits into a groove in the housing so that axially acting forces applied to the retainer ring body can be transmitted via the flange to the housing.

To install such a ring in the groove, the ring is constructed of at least three segments. At least one of the segments is formed so that it can be installed in the groove after the installation of the remaining segments by moving the former past the latter in a radially outward direction. Once installed, the threaded bolts in the main body of the retainer ring segments are tightened against the seal ring to bias the latter into firm engagement with the axially oriented face of the housing. This both securely and immovably mounts the seal ring to the housing and establishes a seal between the seal ring and the axial face so that no fluid can leak past them when the disc is in its closed position.

Generally speaking, therefore, a valve constructed in accordance with the present invention includes a valve housing which defines the earlier mentioned enlarged diameter conduit portion extending from one of the ends of the housing to the axially oriented face which is spaced inward from that housing end. Disposed in the enlarged diameter conduit portion and located between the axially oriented face and the adjacent housing end is an inwardly open, circumferential groove. A seal ring is disposed in the space between the groove and the axially oriented housing face. A retainer ring is constructed of at least three segments, each having a main body projecting into the enlarged conduit portion of the housing so that it overlies a base of the seal ring and a flange. The latter snugly fits into the groove so that it can transmit axial forces from the segment to the housing. At least one of the segments has parallel ends which are opposite and closely adjacent correspondingly parallel ends of the adjoining retainer ring segments. This segment can then be inserted into or withdrawn from the groove after the remaining segments have been installed by moving it in a radial direction in and out of the groove.

Each segment also includes one or more force-applying members such as axially oriented, threaded bolts one end of which is accessible from the adjacent end of the housing and the other engages the base of the seal ring, directly or via an intermediate spacer ring. When tightened the bolts generate the required force for securely mounting the seal ring and establishing a seal between it and the opposing housing face. The reaction force from the tightened bolts is transmitted via the body of the retainer ring segments and their flanges to the housing.

This installation significantly reduces the radial space requirements for the retainer ring and the means for securing it to the housing. Thus, it can be used with the radially relatively larger metal seal rings without encountering space problems or weakening the housing. The flange and the flange receiving groove in the housing will frequently be not much wider (in a radial direction) than the diameter of the bolts with which prior art seal ring retainer rings were secured to the housing. This makes the present invention ideally suited for valves having pivotable closure members such as disc valves in which the seal ring must be installed in the housing.

The pressure generating bolts in the retainer ring are inside the outermost seal ring diameter and, therefore, do not take up scarce space between the valve conduit, the housing exterior and the mounting flange. The relatively narrow (in a radial direction) flange occupies only little additional space. Hence, valves constructed in accordance with the present invention are ideally suited for valves which require metallic seal rings due to high pressures, temperatures and/or the presence of corrosive fluids. Yet, the installation is relatively simple and inexpensive and, therefore, constitutes an ideal solution to the problem discussed earlier.

DESCRIPTION OF THE PREFERRED EMBODIMENT

Figure 1:
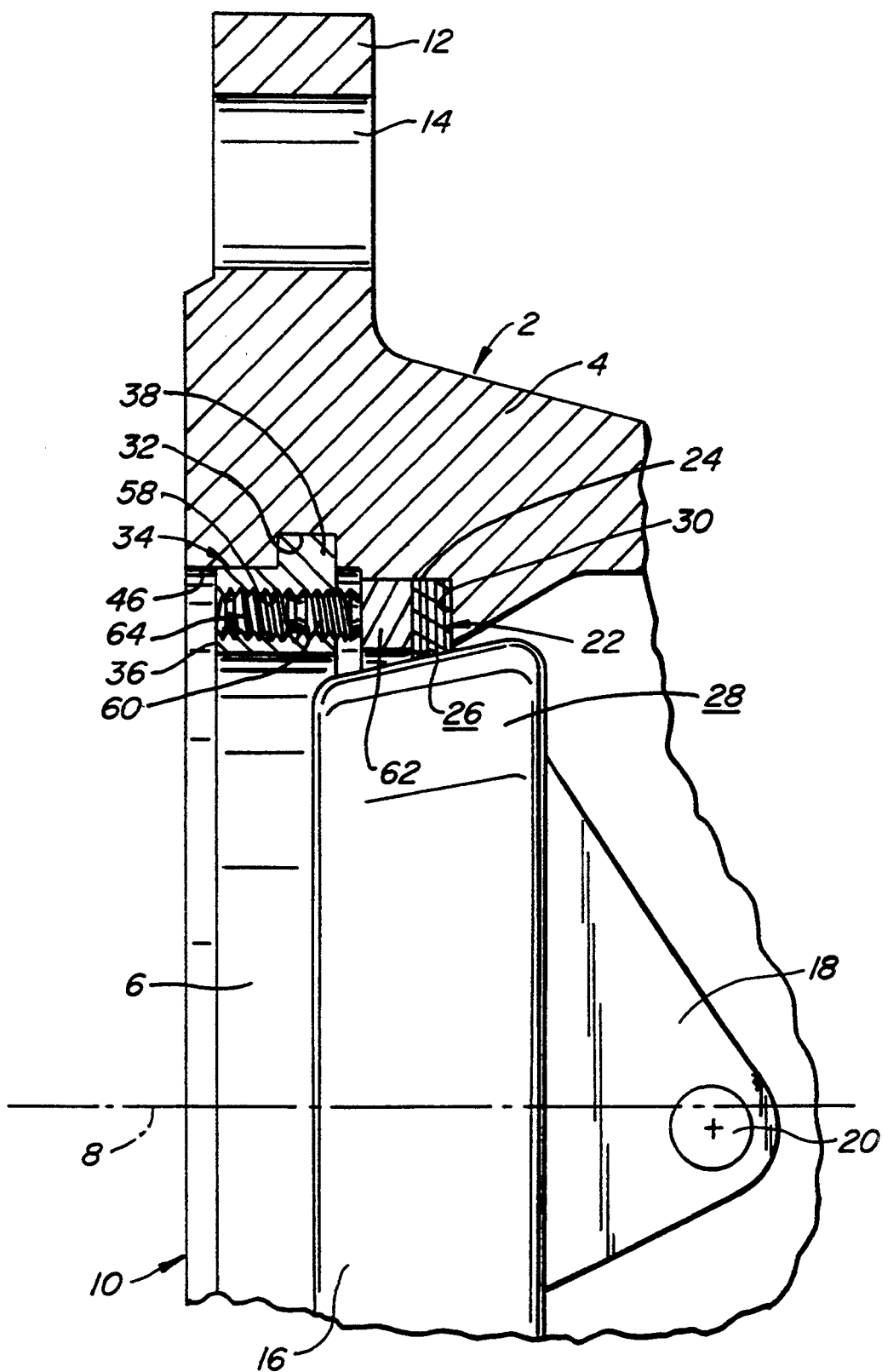
FIG. 1 is a fragmentary, side elevational view, in section, through a valve constructed in accordance with the present invention.

Referring to the drawings, a disc valve 2 includes a housing 4 forming a fluid flow conduit 6 along a conduit axis 8 extending from a first end 10 to a second end (not shown). A conventional housing flange 12 extends radially outwardly from the housing at the first housing end and includes bolt holes 14 for securing the valve to a pipeline or the like (not shown) with threaded bolts (not shown). Inside the conduit there is a valve disc 16 fitted with brackets 18 which are rotationally fixed to shaft 20. The axis of the pivot shaft is typically offset from the conduit axis 8. Thus, pivotal movements of the flange are imparted to the disc and move the disc between its open position (not shown) in which it is substantially parallel to the housing axis and its closed position illustrated in FIG. 1.

A metal seal ring 22, typically constructed of a plurality of annular laminations 24, is mounted to the housing and includes a radially inwardly facing, typically slanted (with respect to housing axis 8) sealing surface 26 which engages a typically cone-shaped peripheral seating surface 28 of the disc when the latter is in its closed position (illustrated in FIG. 1) to establish a leakproof seal. By pivoting the disc in a clockwise direction, as seen in FIG. 1, the seal between the seal ring and the seating surface of the disc is broken and when the disc is substantially parallel to the conduit axis 8 the valve is in its fully opened position.

Housing conduit 6 includes an enlarged diameter portion extending from the first housing end 10 to an axially oriented face 30 which is spaced from and faces the first housing end. Spaced some distance from the face and located between it and the first housing end is a radially inwardly open circumferential groove 32 which, in the preferred embodiment, has a square or rectangular cross section. A retainer ring 34 is defined by an annular main body 36 and a flange 38 projecting radially outwardly therefrom. The flange is dimensioned so that it snugly fits into groove 32, that is so that the flange can be seated therein by slidably inserting it. The tolerances are sufficiently tight, however, so that there is substantially no play between the flange and the groove.

Figure 2:
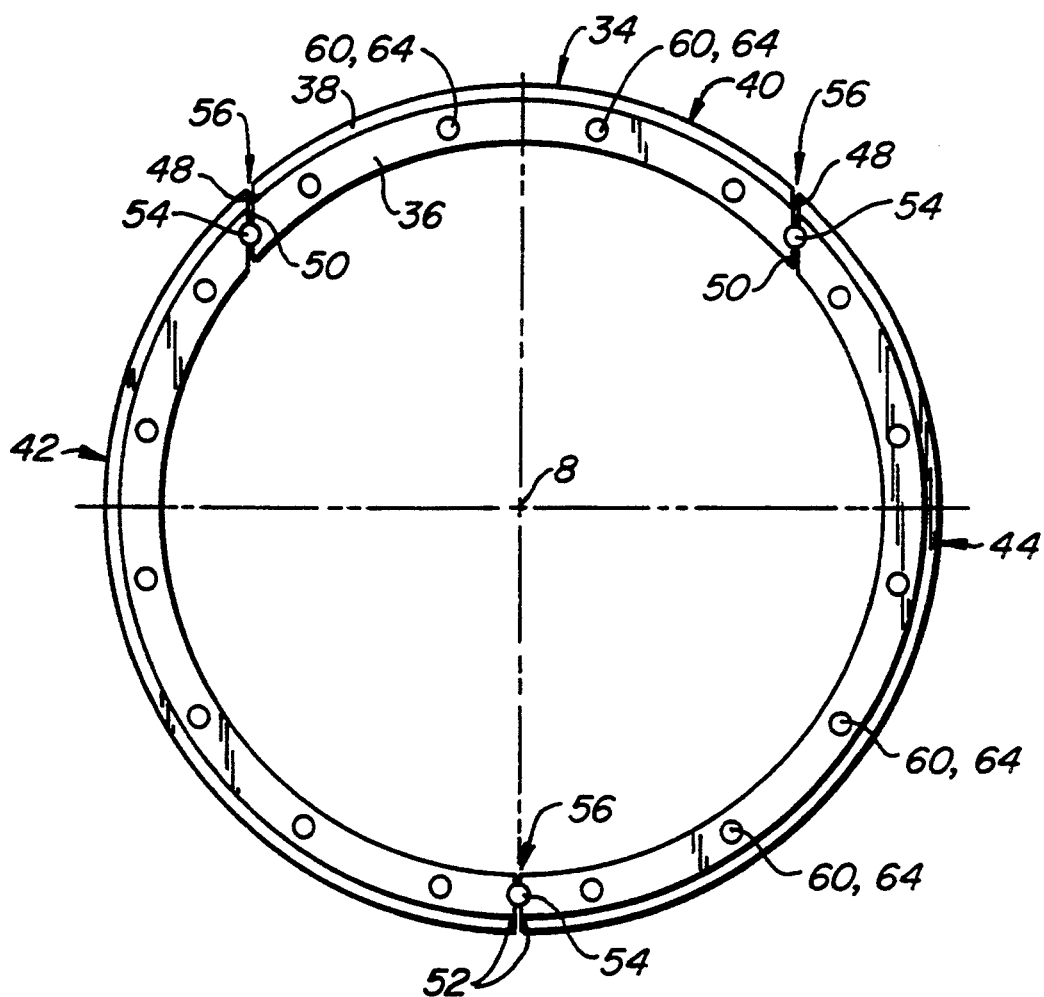
FIG. 2 is a side elevational view of a seal ring retainer ring used in the valve shown in FIG. 1.

To enable the installation of the retainer ring in the circumferential housing groove, the ring is constructed of three or more ring segments 40, 42 and 44, each extending over an arc of less than 180°. The retainer ring is installed by initially positioning the segments interiorly of valve conduit walls 46 and, thereafter, moving them radially outwardly until their flanges are seated in groove 32. This requires that the ends 48 of at least one of the retainer ring segments, e.g. first segment 40, be parallel to each other. The opposing ends 50 of the adjoining ring segments 42, 44 are parallel to the edges of the first segment as is illustrated in FIG. 2. In a preferred embodiment of the invention employing three retainer ring segments, the other opposing ends 52 of segments 42, 44 are also parallel to each other and, preferably, they are parallel to the ends of the first segment 40 as well.

To prevent the first segment 40 from accidentally dropping out of its engagement with groove 32, for example in instances in which the segment is located at the top of conduit 6, locking pins 54 are inserted in appropriately sized holes which bridge across gaps 56 between opposing ends of the retainer ring segments. The pins may be simple cylindrical pins or they may include threads in which event the corresponding holes in the segments are also threaded. The pins do not extend into the seal ring 22 and they are readily accessible from the first housing end 10 for insertion and removal. Once installed, the pins prevent relative movements between the retainer ring segments in a radial direction so that, for example, the first segment, located at the top of the conduit, cannot gravitationally drop out of groove 32.

Retainer ring 34 further includes at least one, and typically several, axially oriented threaded holes 58 which receive threaded bolts 60, the ends of which abut either a base portion of seal ring 22 (which in turn is radially outward of the portion of the seal ring defining sealing surface 26) or a pressure ring 62 which overlies the base portion of the seal ring. By tightening bolts 60 an axial force is generated which presses the seal ring laminations 24 against each other and the seal ring as a whole against housing face 30. By giving the base portion of the seal ring a sufficient width (in a radial direction) and providing an appropriate number of bolts 60 in the retainer ring, enough pressure is applied to the seal ring not only to securely retain it between the pressure ring and the opposing housing face 30, and thereby securely mount it to the housing, but to additionally form a seal between the seal ring and the housing face, as well as between the individual seal ring laminations 24, to prevent any leakage past them when disc 16 is closed and fluid pressure is applied to one of the sides of the disc.

The resulting reaction force generated by tightening bolts 60 is transferred from the bolts to main body 34 and from there via flange 38 of the retainer ring to housing 40. Since the flange snugly fits into housing groove 32 effectively no wedging takes place between the retainer ring flange and the housing. To prevent an accidental loosening of threaded bolts 60, which could cause a loss of the seal between the seal ring and the housing face 30, it is preferred to lock the bolts in place with set screws 64.

Turning now to the installation and operation of the seal ring, valve disc 16 will typically be installed first and while it is in its open position seal ring 22 is moved axially into conduit 6 until it abuts axial housing face 30. If used, pressure ring 62 is axially inserted into the housing until it abuts the previously positioned seal ring. To facilitate the centering of both the seal ring and the pressure ring, the outside diameters of the seal ring and the pressure ring are dimensioned so that there is substantially no radial play between them and the inside diameter of conduit 6 where they are seated while permitting them to be axially slidably inserted into and withdrawn from the conduit.

Next, the three or more retainer ring segments 40, 42 and 44 are installed by sequentially inserting all segments except first segment 40 with the parallel ends 48. It is installed last by sliding it in a radial direction and parallel to its ends along the opposing ends 50 of the adjoining segments until its radial flange is seated in groove 32. Locking pins 54 are now installed to maintain the retainer ring segment in their positions and, thereafter, threaded bolts 60 are tightened until the desired axial force is applied to the seal ring which assures a seal between it and housing face 30. Finally, set screws 64 are tightened against threaded bolts 58 to complete the installation.

I claim:

1. A seal ring installation in a fluid flow conduit defining a flow path along a longitudinal axis of the conduit and having a surface facing in an axial direction toward an end of the conduit, the installation comprising a radially inwardly facing groove in the conduit between the surface and the conduit end; a seal ring having a sealing surface protruding into the flow path and placed against the axially oriented surface; a retainer ring having a radial flange fitted into the groove and a body radially inward of the flange between the seal ring and the end of the conduit, the retainer ring being constructed of at least three segments, at least one segment having first and second ends which are parallel to each other so that the at least one segment can be moved radially outwardly relative to the other segments when the flanges of the other segments are in the groove for inserting and withdrawing the flange of the at least one segment from the groove; and means carried by the body of the retainer ring for applying an axially acting pressure against the seal ring to retain the seal ring to the conduit and seal it against the axially facing surface of the conduit.

2. An installation according to claim 1, wherein the groove is axially spaced from the surface.

3. An installation according to claim 1, wherein the groove has an innermost diameter which is at least as large as an outermost diameter of the axially facing surface.

4. An installation according to claim 1, wherein the seal ring is a metallic seal ring defining an inwardly oriented sealing surface.

5. An installation according to claim 4, wherein the seal ring comprises a plurality of laminations.

6. An installation according to claim 1, wherein the pressure applying means comprises at least one axially oriented threaded bolt carried by each retainer ring segment and adapted to be threaded into engagement with the seal ring for generating the seal ring retaining pressure.

7. An installation according to claim 6, including means for locking the threaded bolts in a desired position to maintain the applied pressure on the seal ring.

8. An installation according to claim 6, including a pressure ring disposed between the seal ring and the retainer ring so that the threaded bolt applies pressure against the seal ring via the pressure ring.

9. An installation according to claim 1, including locking means preventing the at least one segment from moving relative to adjoining seal ring segments in a radial direction.

10. An installation according to claim 9, wherein the locking means comprises means connecting an end of the at least one segment with an end of an adjacent retainer ring segment.

11. An installation according to claim 9, wherein the locking means comprises a pin disposed in a hole formed by the adjoining ends of the retainer ring segments.

12. An installation according to claim 11, wherein the pin is spaced apart from the axially facing surface.

13. An installation according to claim 11, wherein the pin is disposed between the seal ring and the end of the conduit.

14. An installation according to claim 13 including means for threadably engaging the pin with the at least one segment and the adjoining segment.

15. A disc valve comprising a housing defining an axial fluid flow conduit between ends of the housing, the housing defining an enlarged diameter conduit portion extending from one of the ends toward another one of the ends and terminating at an axially oriented face which is spaced from the one end; a valve disc in the conduit mounted to the housing for pivotal movement between an open position in which the disk is substantially parallel to the conduit and a closed position in which it is transverse to the conduit; a seal ring having an inwardly oriented sealing surface for sealingly engaging a seating surface of the disc, the seal ring being placed against the face; a retainer ring located between the seal ring and the one housing end and constructed of first, second and third segments, each terminating in ends, the ends of the first segment being parallel to each other so that the first segment can move relative to the second and third segments in a radial direction; holding means for securing the retainer ring to the housing and preventing relative axial movement between the retainer ring and the housing; and pressure means carried by the retainer ring for biasing the seal ring against the face to thereby form a seal between the face and the seal ring; whereby the retainer ring can be installed after the installation of the seal ring by positioning the second and third segments in the housing and sliding the first segment from inside the flow conduit in a radially outward direction until its ends are aligned with the ends of adjoining segments.

16. A valve according to claim 15, wherein the holding means comprises a radially inwardly open groove formed in the housing and disposed between the face and the one end of the housing, and wherein the retainer ring includes a main body and a flange protruding upwardly therefrom, the flange being sized to fit into the groove so that the seal ring can transfer an axial force applied to the body via the flange to the housing.

17. A valve according to claim 15, wherein the pressure means comprises at least one axially oriented threaded hole in each retainer ring segment and a threaded bolt in each threaded hole for generating an axial force which biases the seal ring against the face by tightening the threaded bolts.

18. A valve according to claim 15, including pin means between opposing edges of the first segment and adjoining retainer ring segment edges, the pin means extending past the edges into the respective segments to prevent the first segment from moving in a radial direction relative to adjoining segments.

19. A valve according to claim 18, wherein the pin means comprises cylindrical locking pins.

20. A disc valve comprising a housing defining an axial conduit between housing ends, an axially oriented sealing face spaced from and facing one of the ends, an enlarged diameter conduit portion between the face and the one housing end, and a circumferential groove in the enlarged diameter portion of the housing which is spaced from the face; a valve disc inside the conduit and mounted to the housing for pivotal movement between an open position and a closed position, the disc defining a radially oriented seal ring seating surface located proximate the face when the disc is in its closed position; a seal ring placed against the sealing face and having a radially inwardly oriented sealing surface adapted to be engaged by and form a fluid-tight seal with the seating surface of the disc; a seal ring retainer ring formed of at least three segments and having a main body and a flange protruding radially outwardly of the body, the flange being sized to be disposed in the groove and to snugly engage the groove so that the groove supports the flanges and permits the transfer of axially acting forces from the retainer ring body via the flange to the housing, at least one of the segments having ends opposing ends of adjacent segments which are formed to permit a slidable movement of the at least one segment in a radial direction for inserting and withdrawing its flange into and from the groove while the other segments are disposed in the groove; and threaded bolt means carried by the segments, accessible from the one housing end and operable to apply axially acting forces to the seal ring to thereby bias the seal ring into fluid sealing engagement with the face to prevent fluid leakage between the seal ring and the face when the disc is in its closed position and fluid pressure is applied to one of its sides.

21. A valve according to claim 20, wherein the seal ring is a metallic seal ring.

22. A valve according to claim 21, wherein the metallic seal ring comprises a plurality of ring-shaped metal laminates.

23. A valve according to claim 21, wherein the ends of the segments adjoining the at least one segment and the ends of the at least one seal ring are parallel.

24. A valve according to claim 23, wherein all ends of the retaining ring segments are parallel.

25. A valve according to claim 24, including means removably attached to the segments for preventing relative movements of the segments in a radial direction.

26. A valve according to claim 25, including a pressure ring between the seal ring and the threaded bolt means so that the axially acting forces are applied to the seal ring via the pressure ring.

27. A method of mounting a seal ring in a valve which has a valve body defining an axial fluid passage and a closure member disposed in the conduit and pivotally mounted to the housing for movements between open and closed positions, the method comprising the steps of:
forming an enlarged diameter housing conduit portion extending from one end of the housing to a face oriented toward the one housing end;
forming a radially inwardly open groove in the enlarged conduit portion intermediate the face and the one housing end;
placing a seal ring having a sealing surface adapted to sealingly engage the closure member against the face;
providing at least three retainer ring segments which together extend over substantially about 360° and which each include a body portion and a flange extending radially outwardly therefrom, each segment extending over an arc of less than 180°;
inserting the flanges of all but one of the segments into the groove so that the segments are disposed in a common plane which includes the groove;
thereafter aligning the one segment with said plane and moving the one segment relative to the housing and to the other segments in a radial direction until its flange is inserted in the groove;
thereafter generating axially acting forces between the seal ring and the body portion biasing the seal ring and the retaining ring apart and thereby the seal ring into sealing engagement with the face; and
transferring the axially acting forces via the flange on the retaining ring segments to the housing.

28. A method according to claim 27 including the step of holding the retaining ring segments in their respective positions by releasably securing them to each other.

29. A method according to claim 27, wherein the step of generating the axially acting forces comprises the step of threadably extending a bolt through each retaining ring segment and tightening the bolts against the seal ring.

* * * * *